US012272013B2

(12) United States Patent
Parr

(10) Patent No.: US 12,272,013 B2
(45) Date of Patent: Apr. 8, 2025

(54) CREATING CLOUD-HOSTED, STREAMED AUGMENTED REALITY EXPERIENCES WITH LOW PERCEIVED LATENCY

(71) Applicant: Home Box Office, Inc., New York, NY (US)

(72) Inventor: Richard Parr, Albertson, NY (US)

(73) Assignee: HOME BOX OFFICE, INC., New York, NY (US)

( * ) Notice: Subject to any disclaimer, the term of this patent is extended or adjusted under 35 U.S.C. 154(b) by 0 days.

(21) Appl. No.: 18/395,986

(22) Filed: Dec. 26, 2023

(65) Prior Publication Data

US 2024/0169680 A1 May 23, 2024

Related U.S. Application Data

(63) Continuation of application No. 17/656,677, filed on Mar. 28, 2022, now Pat. No. 11,900,551, which is a
(Continued)

(51) Int. Cl.
*G06T 19/00* (2011.01)
*G06T 15/00* (2011.01)
*G06T 15/50* (2011.01)

(52) U.S. Cl.
CPC .......... *G06T 19/006* (2013.01); *G06T 15/005* (2013.01); *G06T 15/50* (2013.01)

(58) Field of Classification Search
None
See application file for complete search history.

(56) References Cited

U.S. PATENT DOCUMENTS 7,170,511 B2 * 1/2007 Sowizral ............... G06T 17/005
345/420
2011/0187744 A1 8/2011 Kim et al.
(Continued)

FOREIGN PATENT DOCUMENTS

WO 2012/007764 A1 1/2012
WO 2017/214559 A1 12/2017

OTHER PUBLICATIONS

Stadia, "Stadia—One Place for All the Ways We Play", Downloaded from the Internet, Jun. 4, 2021, https://stadia.google.com/, 1 page.
(Continued)

*Primary Examiner* — Robert J Craddock
(74) *Attorney, Agent, or Firm* — Amin, Turocy & Watson, LLP

(57) ABSTRACT

A technology that streams graphical components and rendering instructions to a client device, for the client device to perform the final rendering and overlaying of that content onto the client's video stream based on the client's most recent tracking of the device's position and orientation. A client device sends a request for augmented reality drawing data to a network device. In response, the network device generates augmented reality drawing data, which can be augmented reality change data based on the augmented reality information and previous client render state information, and sends the augmented reality drawing data to the client device. The client device receives the augmented reality drawing data and renders a visible representation of an augmented reality scene comprising overlaying augmented reality graphics over a current video scene obtained from a camera of the client device.

20 Claims, 11 Drawing Sheets

Related U.S. Application Data continuation of application No. 17/192,325, filed on Mar. 4, 2021, now Pat. No. 11,321,931.

(60) Provisional application No. 63/002,655, filed on Mar. 31, 2020.

(56) References Cited

U.S. PATENT DOCUMENTS

| | | |
|---|---|---|
| 2012/0092328 A1 | 4/2012 | Flaks et al. |
| 2013/0127980 A1 | 5/2013 | Haddick et al. |
| 2013/0293468 A1 | 11/2013 | Perez et al. |
| 2019/0073831 A1 | 3/2019 | Kim |
| 2022/0038529 A1 | 2/2022 | Wang et al. |

OTHER PUBLICATIONS

Nvidia, "Nvidia GeForce Now", Downloaded from the Internet, Jun. 4, 2021, https://www.nvidia.com/en-gb/geforce/products/geforce-now/, 12 pages.

Parsec, "Connect to Work or Games from Anywhere", Downloaded from the Internet, Jun. 4, 2021, https://parsecgaming.com/, 7 pages.

Unreal Engine, "Pixel Streaming", Downloaded from the Internet, Jun. 4, 2021, https://docs.unrealengine.com/enUS/Platforms/PixelStreaming/index.html, 5 pages.

Polystream, "An Exciting New Way to Engage Both Players and Spectators from Withing Your Game", Downloaded from the Internet, Jun. 4, 2021, https://polystream.com/, 8 pages.

Non-Final Office Action received for U.S. Appl. No. 17/192,325 dated Aug. 5, 2021, 23 pages.

International Search Report and Written Opinion received for International Application No. PCT/US2021/024709 dated Aug. 11, 2021, 19 pages.

Invitation to Pay Additional Fees received for International Application No. PCT/US2021/024709 dated Jun. 21, 2021, 12 pages.

International Preliminary Report on Patentability received for International Application No. PCT/US2021/024709 dated Sep. 29, 2022, 11 pages.

Non-Final Office Action received for U.S. Appl. No. 17/656,677, dated Oct. 14, 2022, 30 pages.

Final Office Action received for U.S. Appl. No. 17/656,677, dated Apr. 26, 2023, 44 pages.

Kato et al., "Marker Tracking and HMD Calibration for a Video-based Augmented Reality Conferencing System", Proceedings 2nd IEEE and ACM International Workshop on Augmented Reality, Oct. 21, 1999, 110 pages.

Advisory Action received for U.S. Appl. No. 17/656,677, dated Jul. 13, 2023, 13 pages.

Notice of Allowance received for U.S. Appl. No. 17/656,677, dated Sep. 28, 2023, 20 pages.

\* cited by examiner

Continued at FIG. 5

CREATING CLOUD-HOSTED, STREAMED AUGMENTED REALITY EXPERIENCES WITH LOW PERCEIVED LATENCY

CROSS-REFERENCE TO RELATED APPLICATION

This application is a continuation of, and claims priority to each of, issued U.S. Pat. No. 11,321,931, issued on May 3, 2022 and filed on Mar. 4, 2021, entitled "CREATING CLOUD-HOSTED, STREAMED AUGMENTED REALITY EXPERIENCES WITH LOW PERCEIVED LATENCY", which claims the benefit of U.S. Provisional Patent Application No. 63/002,655, filed on Mar. 31, 2020, entitled "CREATING CLOUD-HOSTED, STREAMED AUGMENTED REALITY EXPERIENCES WITH LOW PERCEIVED LATENCY." This application also claims priority to pending U.S. patent application Ser. No. 17/656,677, filed on Mar. 28, 2022, entitled "CREATING CLOUD-HOSTED, STREAMED AUGMENTED REALITY EXPERIENCES WITH LOW PERCEIVED LATENCY." The entireties of the aforementioned documents are hereby incorporated herein by reference.

BACKGROUND

Streaming videogame services have advantages over traditional videogame distribution methods, including that streaming eliminates distribution via physical discs or online downloads, and that that streaming does not require every player to have an expensive gaming console or personal computer to run the game at its best. The main drawback to streaming is lag, resulting from the time it takes for the players actions (e.g. hitting a button on a game controller) to be transmitted to the host server in the cloud, for that to be acted upon by the game software, and for the resultant output of the game to be streamed back to the player as video. Such latency is typically on the order of a few tens of milliseconds, but tends to get worse the further away from the physical location of the server the player is, and is also affected by the quality of the player's internet connection.

Augmented reality is an increasingly popular category of game or interactive experience that uses videogame technology to draw three-dimensional (3D) graphics, overlaying those graphics onto a video stream taken from a device's camera, such as a cellphone or a more dedicated augmented reality headset. Streamed augmented reality can be done in the same way as streamed videogames. However, the time taken to send the video feed (e.g., an image of a scene) from the client device to the cloud host, then overlay graphics and stream the resulting frame back again, adds lag to the augmented reality experience that makes it difficult to enjoy. Indeed, as the viewer/player moves the camera device, any lag that occurs causes the viewer to see resultant images that are not current with respect to where the camera is aiming, which is very noticeable and unpleasant.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects described herein are generally directed towards a technology in which an augmented reality experience runs the main portion of the augmented reality code in a cloud host service, while streaming graphical components and rendering instructions to the client device. The client device performs the final rendering and overlaying of that content onto the client's video stream, including with the client device's most recent tracking of the device's position and orientation. The graphical components and rendering instructions can be based on changes (deltas) relative to a previous state, thereby significantly reducing the amount of data communicated between the cloud host service and the client device. This significantly reduces the lag that would be otherwise experienced by the viewer, as any movement of the client device is reflected (virtually) immediately and/or with imperceptible delay in the rendered output. At the same time, the technology maintains most of the advantages of cloud-hosting augmented reality experiences, including, but not limited to higher CPU capabilities for advanced augmented reality experiences, access to a large library of augmented reality experiences without needing to install each experience on the client device, and potentially more straightforward creation of multi-user experiences.

It should be understood that any of the examples herein are non-limiting. For instance, typically the client device can be a mobile device including a camera and software, such as provided in a smartphone or tablet device that includes a camera, but can work with any device capable of running application software and incorporating a camera or being coupled to an external camera. As another example, the technology described herein generally operates by having a cloud hosting service perform the augmented reality-related operations, however various alternative implementations can have the client device perform some of the augmented reality-related operations to some lesser extent. As such, the technology described herein is not limited to any particular embodiments, aspects, concepts, structures, functionalities or examples described herein. Rather, any of the embodiments, aspects, concepts, structures, functionalities or examples described herein are non-limiting, and the technology may be used in various ways that provide benefits and advantages in computing and augmented reality in general.

Figure 1:
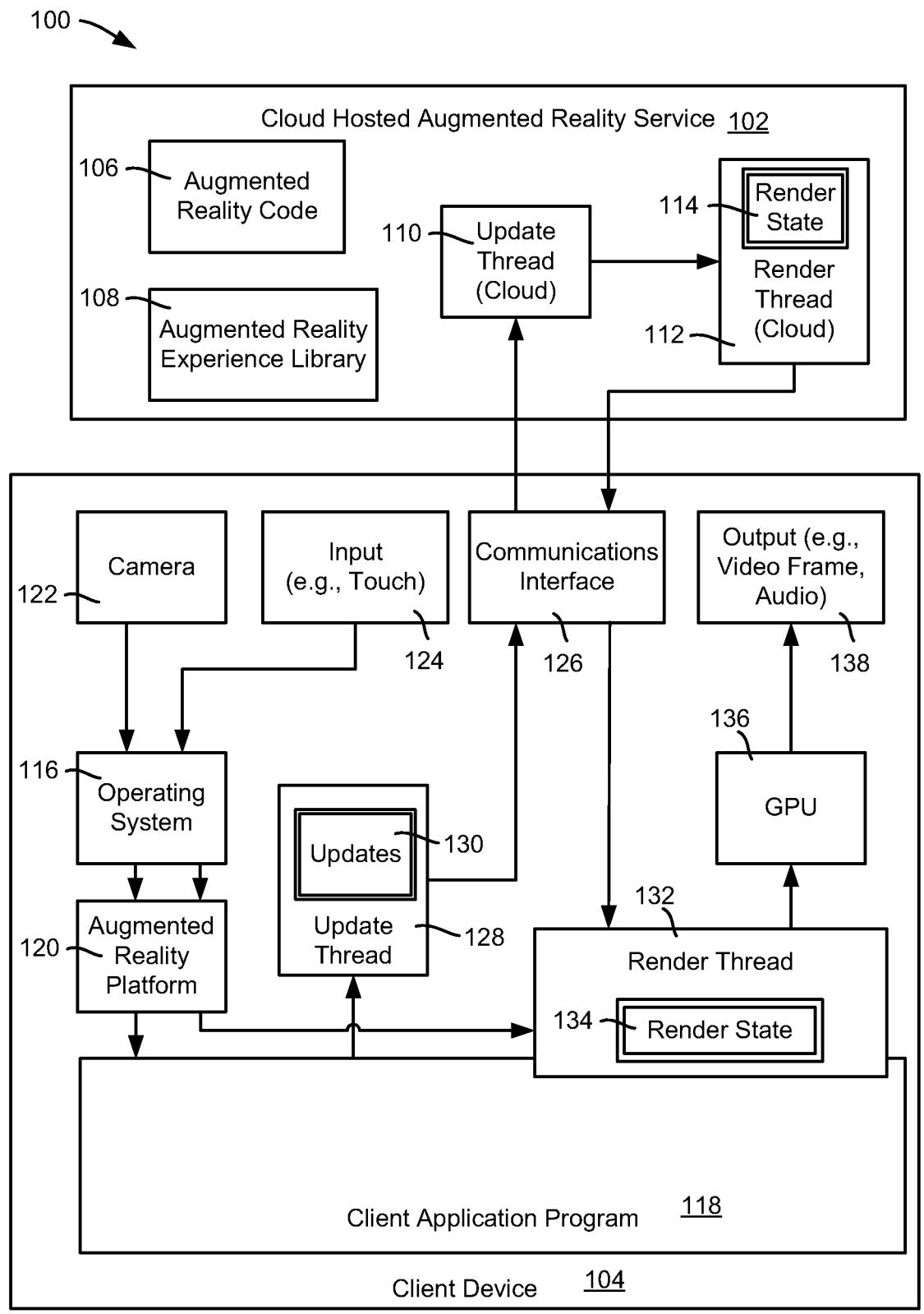
FIG. 1 is an example block diagram representation of a system comprising components that facilitate streamed augmented reality experiences with low perceived latency, in accordance with various aspects and example implementations of the subject disclosure.

FIG. 1 is a generalized block diagram representation of an example system 100 comprising a cloud-hosted augmented reality service 102 coupled for communication with a client device 104 over a suitable communications link. In general, the cloud-hosted augmented reality service 102 executes augmented reality (experience) code 106, at least some of which typically can be obtained from an augmented reality experience library 108 (or libraries). As described herein, the augmented reality code 106 uses a (cloud) update thread 110 and a (cloud) render thread 112, which maintains render state data 114. As is understood, the cloud service 102 typically includes relatively powerful computing resources, such as multiple processors and large amounts of storage capacity. Note that instead of or in addition to a cloud hosted service, the components can be run on an edge compute resource, for example, or any other network device or the like capable of running augmented reality experiences.

The illustrated client device 104 includes an operating system 116 which runs a client application program 118 configured to perform virtual reality operations. The client application program 118 gets information from the client device operating system 116 via the specific augmented reality platform 120 (such as corresponding to augmented reality software development kits (SDKs) that the operating system 116 provides (e.g. ARKIT on 10S, ARCORE on ANDROID or LUMIN SDK ON MAGIC LEAP)). The information can include video frame data from a camera 122 of the client device, that is, a camera incorporated into or coupled to the client device 104 and any (e.g., touch, voice, etc.) input information from one or more input devices 124 of (incorporated into or coupled to) the client device 104.

Also shown in FIG. 1 is a communications interface 126 by which the client device can send video and other update information to the cloud service 102, and receive back data including rendering information. As described herein, the various operations are based on a (client) update thread 128, which provides the update data 130 and (client) render thread 132 which maintains the client render state data 134. The render thread is coupled to a graphics processing unit (GPU) 136 that renders the video frames on a suitable output device 138, typically a display screen. Note that other output is also feasible, such as audio that accompanies the video output, as well as possibly tactile output.

Figure 2:
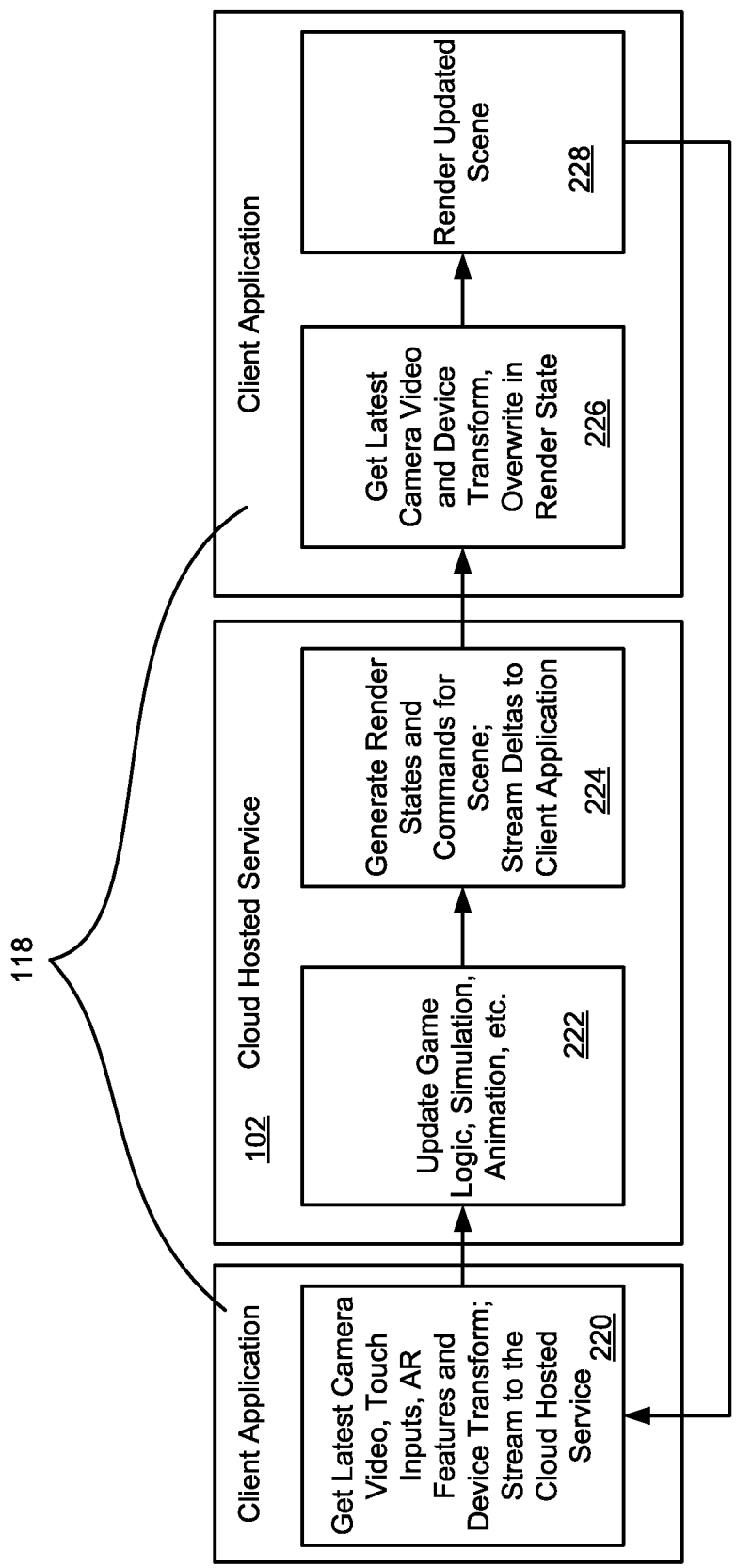
FIG. 2 is an example block diagram representation of a data flow/pipeline of operations that loop back to update video data with augmented reality overlaid graphics, in accordance with various aspects and example implementations of the subject disclosure.

FIG. 2 shows a high level flow of information, including an update loop, such as for the system 100 of FIG. 1. As can be seen, the client application program 118 obtains the latest camera video, touch input data, augmented reality (AR) features and the current device transform (block 220). The client application program 118 streams this information to the cloud hosted service 102.

The cloud hosted service uses this information to update simulation, animation, any "game-like" logic, and so forth, as represented via block 222. For example, the user input may cause an overlaid augmented reality object such as an animated character to begin to jump relative to a real-world background.

As described herein, the cloud hosted service 102 does not (ordinarily) return the augmented video frame to the client application program 118, but rather as represented at block 224, generates render state data and commands for a scene, and streams deltas to the client application program 118. By way of example, the data sent by the cloud hosted service 102 to the client device 104 can include information regarding the scene to be rendered, and lists of commands that describe how to render that scene. The scene can be comprised of 3D mesh data (typically vertices and indices) plus material data (textures, shader code and parameters), and transformation matrices that position each object in 3D space. The command lists can contain lists of the objects to draw, separated by commands that alter how the object is drawn. For example, a list can contain a command that specifies that objects are rendered with a particular material, followed by commands that trigger certain objects to be rendered using the current render state, which results in the objects being drawn using the material previously specified. Further commands in the list can switch to other materials, or change how pixels are blended when they are drawn, etc., before the rendering of other objects is triggered. Note that this is generally standard in 3D rendering pipelines; however instead of being sent straight from a CPU to a graphics card on a computer, the data is being sent over a network.

Note that the deltas are relative to a large complex set of data, whereby encoding the changes from the previous frame significantly reduces the amount of data sent. Note however that some changes can be significantly large, for example if adding a new object to the scene. Thus, any communicated data can be further compressed or otherwise encoded before sending to reduce bandwidth. In one or more implementations, the kind of compression used, if any, can depend on the type of data; texture data is already typically compressed, whereas 3D mesh data likely is not and thus can benefit from compression.

As shown in FIG. 2 via block 226, the client application program 118 can get the get latest camera video frame data and device transform information to overwrite the render state data, and with the deltas received from the cloud hosted service 102, render the updated scene (block 228). The client application program 118 then loops back to repeat for the latest camera video, and the process repeats.

Thus, the deltas to the scene and the rendering commands are sent rather than video data, that is, what is sent is a representation of the various object and the like to draw on top of the client device's video. By way of example, consider drawing an animated character and overlaying that character on the video of the room being viewed through a smartphone's camera. If everything is drawn on the server, by the time the new pixels get back to the smartphone, the smartphone often has moved, whereby the experience will suffer from lag as the viewer will be seeing the object from the point of view of the smartphone's location and orientation a significant fraction of a second ago. By keeping the actual current rendering of the pixels on the smartphone, the overlaid data is rendered from the latest point-of-view, that is, overlaid on top of the latest video image, whereby that lag "disappears" to an extent. Note that the server can be running substantially complex code such as based on artificial intelligence and other code for the character, and make the character respond to what the player/phone is doing. The actual lag still affects how quickly that character responds; for example pressing a button on the phone screen to make the character jump will not start the jump animation and position until the message to jump has arrived at the server, the server has processed the message, and that change in the character's animation and position gets send back as part of the command list described above. Notwithstanding, the otherwise blatantly perceived lag, namely the point-of-view from which the scene is being drawn, has been eliminated.

In this way, the system runs interactive augmented reality experiences in the cloud service or the like, while running most of the final rendering of 3D graphical content on the client device. The system uses an updated camera transform to render the content and the input video stream, over which the content is overlaid, at the last moment. While this can be somewhat limited based on the power of the client device's GPU(s), the system can deliver a library of cloud-hosted augmented reality experiences, with the highly desirable interaction for augmented reality obtained, that is, moving the device in the real world and seeing the effect displayed on screen unaffected by network latency.

Figure 3:
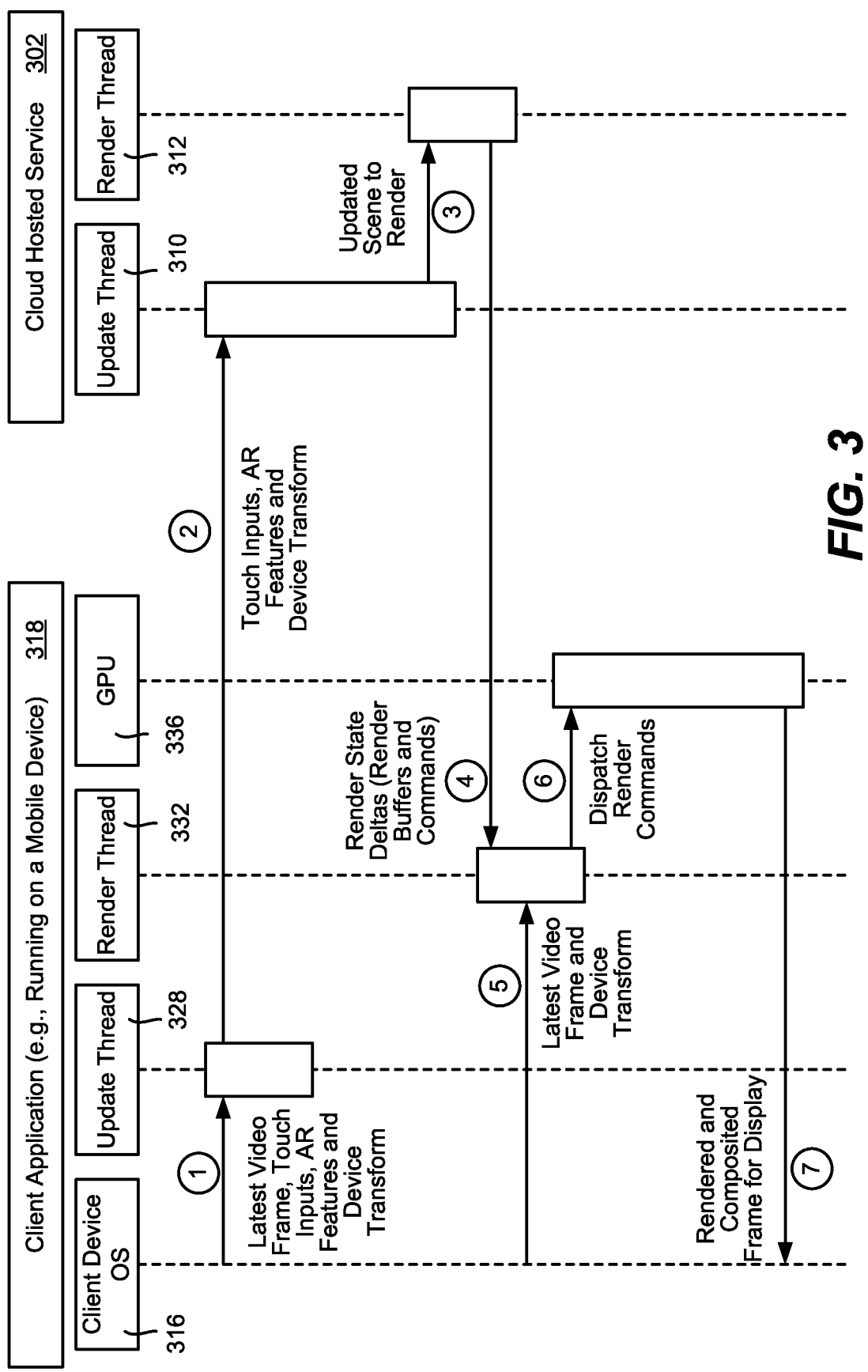
FIG. 3 is an example sequence/dataflow diagram representation of various components that interact to facilitate streamed augmented reality experiences with low perceived latency, in accordance with various aspects and example implementations of the subject disclosure.

FIG. 3 shows how the flow of information including the loop can be further broken down into a sequence/dataflow diagram. As in the example system 100 of FIG. 1, in FIG. 3 the system divides the processing into a client application 318 running on a mobile device, and a cloud hosted service 302 (or an edge compute resource or other network device) that runs on a host instance in a cloud service.

At the start of the frame, as represented by the arrow labeled one (1), the client application 318 gets information from the client device operating system (OS) 316 via the specific augmented reality platform/SDKs that the operating system provides. The information includes the latest video frame from the camera, the transform of the device in world space, any augmented reality feature information that is needed by the cloud hosted service, and any touch input information (and/or other user interaction data). Example augmented reality feature information can include a set of planes that represent flat surfaces detected in the real-world environment, a 3D mesh of the real-world environment, lighting information, and so forth, which can vary depending on the type of client device that is playing back the experience. Note that the "real-world environment" or "world space" is that viewed by the device camera, in contrast to the augmented overlay of graphics data.

The service update thread 310 receives the information from the client update thread 328, as represented in FIG. 3 by the arrow labeled two (2). The service update thread 310 updates the experience based on the latest inputs from the client.

The service update thread 310 outputs a 3D scene to be rendered, which can be represented as a list of render passes and a sorted list of references to the objects to be drawn in each render pass. As represented in FIG. 3 by the arrow labeled three (3), the service update thread 310 provides this 3D rendering scene data to the service render thread 312.

As represented in FIG. 3 by the arrow labeled four (4), the service render thread 312 sends the scene data to the client application render thread 332. The data sent is generally comprised of render buffers that contain vertices, indices, textures, shaders, etc., and draw commands. Note that the service render thread 312 keeps track of the data sent previously, and therefore knows the client application program's render state. In this way only the deltas need to be sent, as the service render thread 312 compares the maintained state with the new desired state, and sends the deltas to the client device render thread 332, reducing the required bandwidth needed to render most frames. As described above, at least some of the delta information can be compressed to further reduce bandwidth.

The client application render thread 332 applies the delta information received for the frame to its render state. However, as represented in FIG. 3 by arrow five (5), the client application also takes in new video and device transform information from the client operating system 316, which the render thread 332 writes into the rendering state. This replaces any stale video buffers or camera transforms, (because the device may have moved), ensuring that the rendering of 3D content is projected from the most recent camera position available.

The client application render thread 332 then dispatches the draw commands to the client's GPU 336 for rendering, as shown via arrow six (6). The final output (the rendered and composited frame for display) is sent to the client device operating system 316 (arrow seven (7)) and thereby displayed on the screen of the client device.

Figure 4:
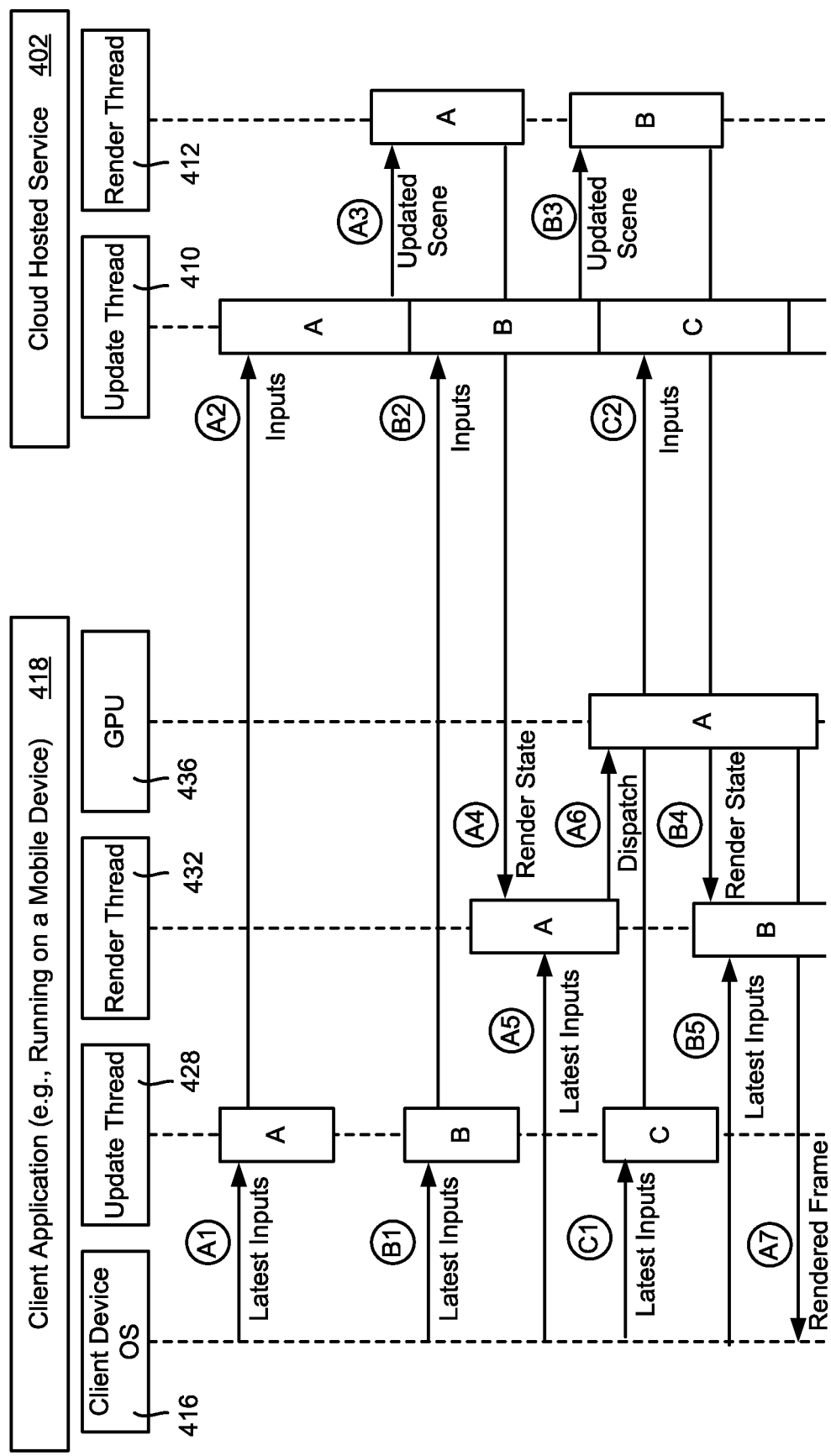
FIGS. 4 and 5 comprise an example sequence/dataflow diagram representation of various components including threads that are scheduled and processed to provide a relatively fast framerate for streamed augmented reality experiences, in accordance with various aspects and example implementations of the subject disclosure.
Figure 5:
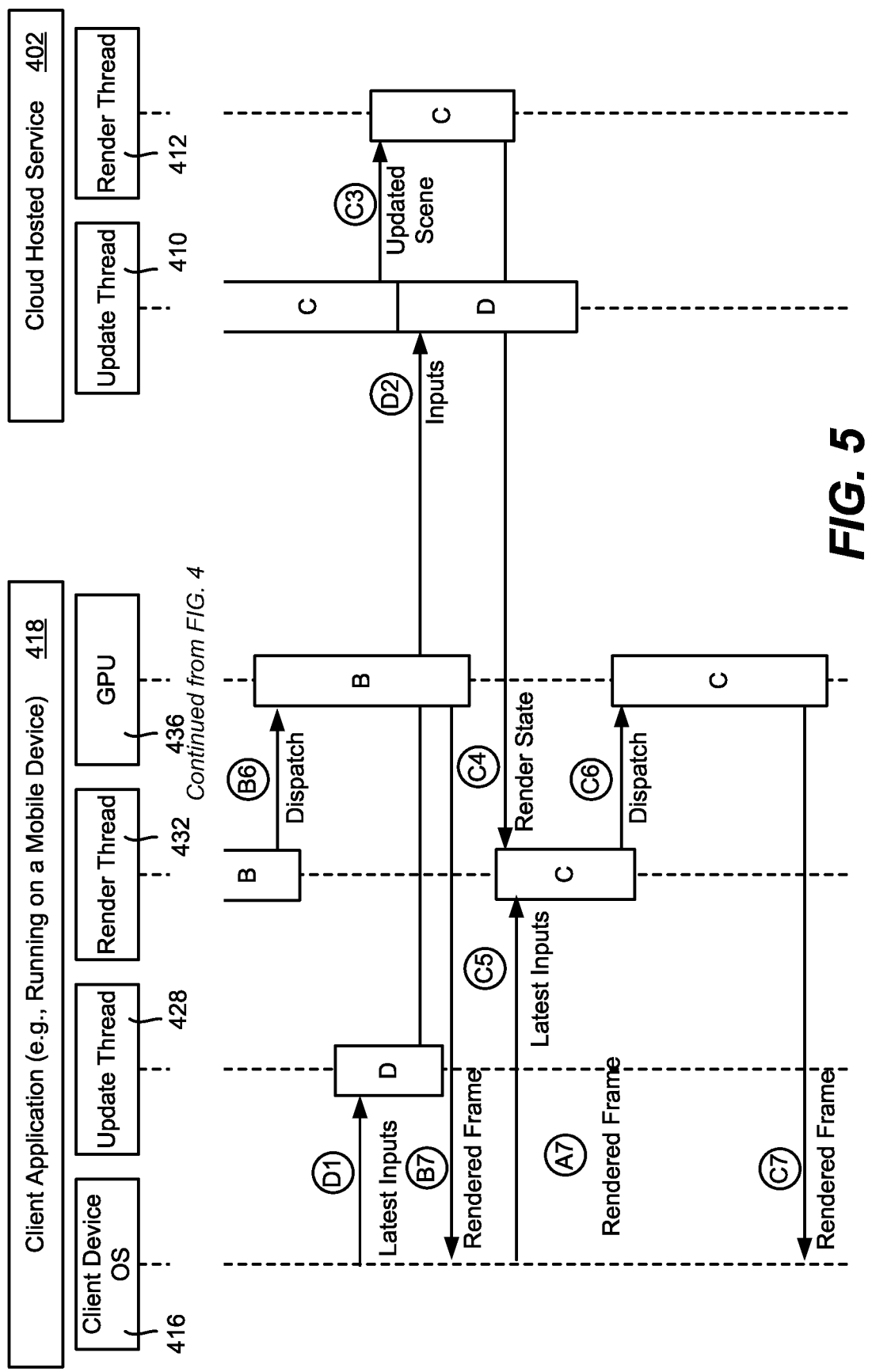

FIGS. 4 and 5 show a dataflow/sequence diagram in which the multiple threads are operating simultaneously on the client device and a cloud-hosted service. The flow of information is generally the same as in FIG. 3 and thus in general each arrow and thread/component are not described again in detail; however as can be seen, the various processes are scheduled to overlap, and the operations pipelined, so that more than one frame is being processed at the same time.

More particularly, in FIGS. 4 and 5, a frame A is started on the client device and processed on the cloud hosted service (arrows A1 and A2), then frame B is started on the client device (arrow B1) and processed while the service's render thread 412 is still dealing with frame A (e.g., arrow A3). As frame A gets passed back to the client application render thread 432 for rendering (arrow A4), frame C is started on the client device (arrow C1), and so on, thus maintaining a high framerate as the client and host do not have to wait and synchronize with each other.

Figure 6:
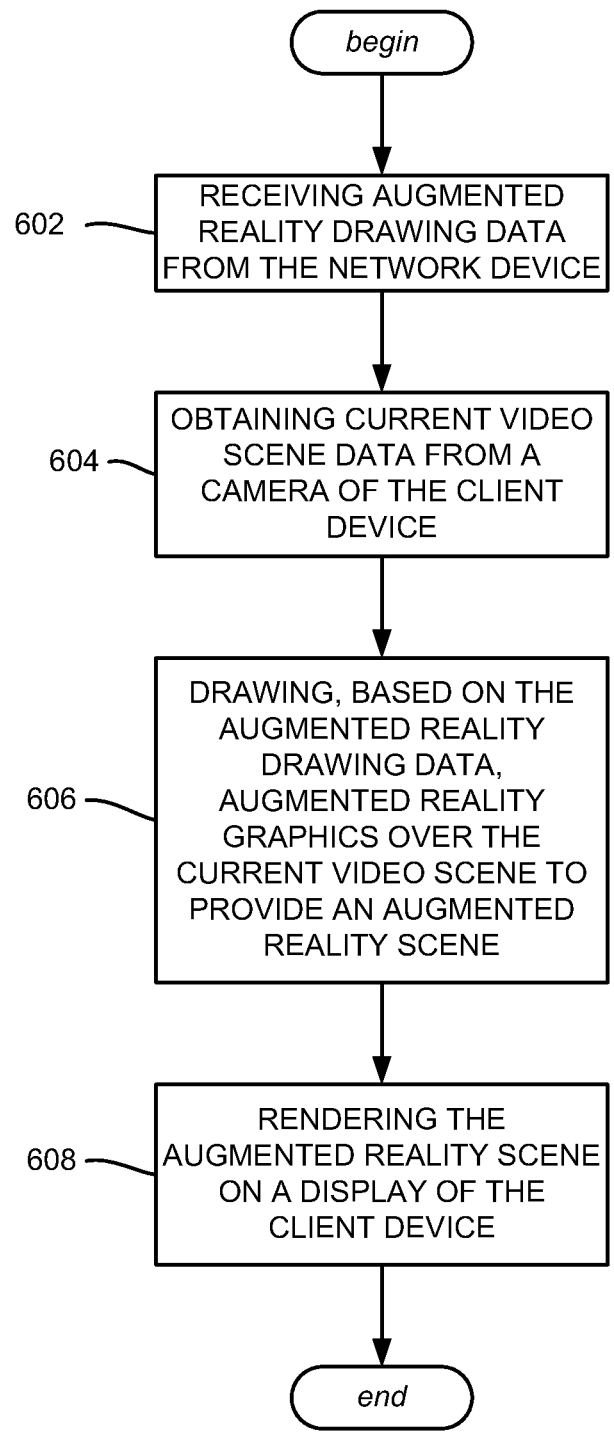
FIG. 6 is a flow diagram of example operations that may be performed by a client device, in accordance with various aspects and example implementations of the subject disclosure.

One or more aspects can be embodied in a system, such as represented in FIG. 6, and for example can comprise a memory that stores computer executable components and/or operations, and a processor of a client device that executes computer executable components and/or operations stored in the memory. Example operations can comprise operation 602, which represents receiving augmented reality drawing data from a network device. Operation 604 represents obtaining current video scene data from a camera of the client device. Operation 606 represents drawing, based on the augmented reality drawing data, augmented reality graphics over the current video scene to provide an augmented reality scene. Operation 608 represents rendering a representation of the augmented reality scene on a display of the client device.

Further operations can comprise changing orientation and/or position of the client device, and wherein the drawing the augmented reality graphics is based on the changing the respective orientation and/or the position.

Further operations can comprise sending augmented reality information from the client device to the network device.

Sending the augmented reality information can comprise sending video frame data obtained by the camera. Sending the augmented reality information can comprise sending a transform of the client device in world space. Sending the augmented reality information can comprise sending input information detected by an input device of the client device.

Sending the augmented reality information can comprise sending augmented reality feature information. The augmented reality feature information can comprise at least one of: a set of one or more planes that represent respective one or more flat surfaces detected in a real-world environment, a three-dimensional mesh of a real-world environment, or lighting information.

The augmented reality drawing data can comprise at least one of: one or more render buffers or one or more draw commands.

The augmented reality drawing data can comprise a first uncompressed part and a second compressed part; further operations can comprise decompressing the second compressed part into a second uncompressed part of the augmented reality drawing data.

Further operations can comprise sending augmented reality information from the client device to the network device; sending the augmented reality information can be performed by an update thread of the client device, and drawing the augmented reality graphics over the current video scene can be performed by a render thread of the client device.

Receiving the augmented reality drawing data from the network device can comprise receiving first augmented reality drawing data; further operations can comprise sending first augmented reality information from the client device to the network device to request the first augmented reality drawing data, and sending, before receiving the first augmented reality drawing data from the network device, second augmented reality information from the client device to the network device to request second augmented reality drawing data.

Figure 7:
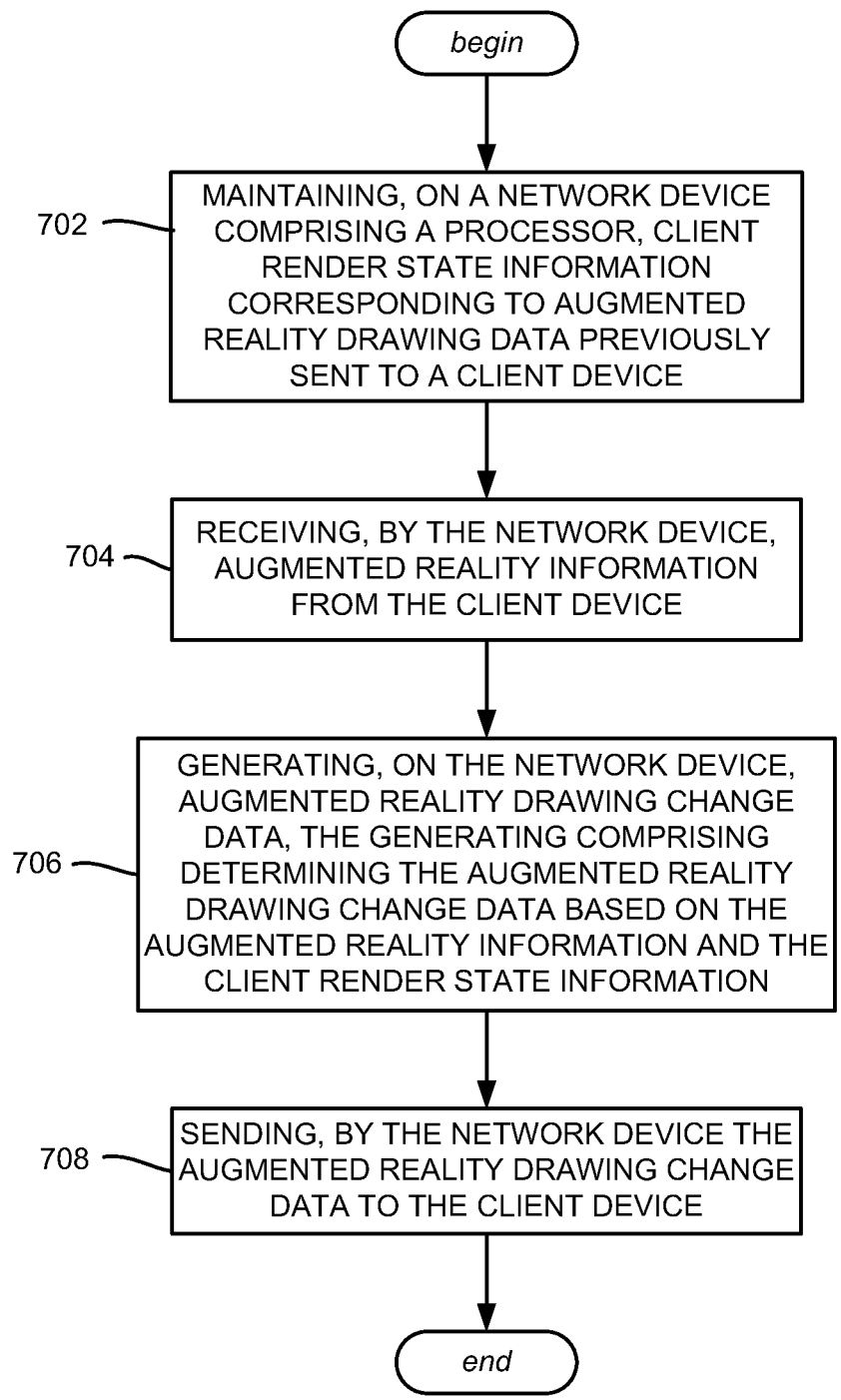
FIG. 7 is a flow diagram of example operations that may be performed by a network device, e.g., of a cloud-hosted service or an edge computing resource, in accordance with various aspects and example implementations of the subject disclosure.

One or more example aspects, such as corresponding to example operations of a method, are represented in FIG. 7. Operation 702 represents maintaining, on a network device comprising a processor, client render state information corresponding to augmented reality drawing data previously sent to a client device. Operation 704 represents receiving, by the network device, augmented reality information from the client device. Operation 706 represents generating, on the network device, augmented reality drawing change data, the generating comprising determining the augmented reality drawing change data based on the augmented reality information and the client render state information. Operation 708 represents sending, by the network device the augmented reality drawing change data to the client device.

The augmented reality information can be first augmented reality information, and the augmented reality drawing change data can be first augmented reality drawing change data; further aspects can comprise receiving second augmented reality information from the client device indicating that at least one of: the client device position has changed, or the client device orientation has changed.

The augmented reality information can be first augmented reality information, and the augmented reality drawing change data can be first augmented reality drawing change data; aspects can comprise receiving, before sending the first augmented reality drawing change data, second augmented reality information from the client device in a request for second augmented reality information.

The augmented reality drawing change data can comprise at least one of: a render buffer, or a draw command.

Figure 8:
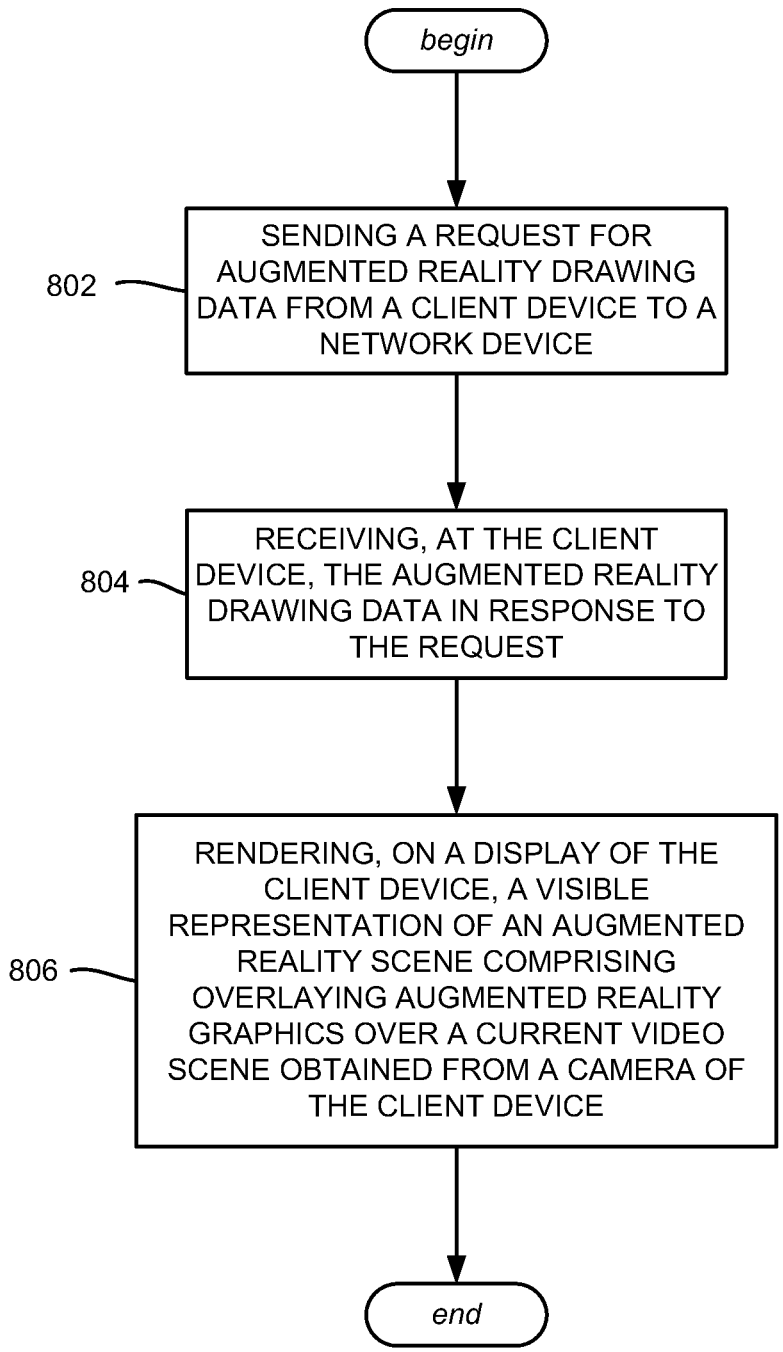
FIG. 8 is a flow diagram of example operations that may be performed by a client device to render a representation of an augmented reality scene, in accordance with various aspects and example implementations of the subject disclosure.

FIG. 8 summarizes various example operations, e.g., corresponding to a machine-readable storage medium, comprising executable instructions that, when executed by a processor, facilitate performance of operations. Operation 802 represents sending a request for augmented reality drawing data from a client device to a network device. Operation 804 represents receiving, at the client device, the augmented reality drawing data in response to the request. Operation 806 represents rendering, on a display of the client device, a visible representation of an augmented reality scene comprising overlaying augmented reality graphics over a current video scene obtained from a camera of the client device.

Further operations can comprise sending, to the network device, at least one of: video frame data, a transform of the client device in world space, augmented reality feature information, lighting information, or input information detected by an input device of the client device.

Further operations can comprise sending, to the network device, at least one of: first data corresponding to a set of one or more respective planes that represent respective one or more flat surfaces detected in a real-world environment, or second data corresponding to a three-dimensional mesh of a real-world environment.

As can be seen, the network device (e.g., cloud-hosting or edge computing hosting) of the augmented reality experiences facilitates numerous advantages, including providing the client device with straightforward access to a large library of content without needing to install separate applications on the client device. The library of experiences can be updated at a common location (rather than on each device) to fix bugs, add new features, and so forth. The technology provides seamless integration of augmented reality experiences alongside other kinds of streamed content (e.g., video and other interactive experiences) in as little as a single application program. The experiences are able to use CPU and other computing resources that are potentially much larger than those available on mobile devices, to deliver richer content. The technology facilitates the simplified creation of multi-user experiences, as networked game code can run on basically identical servers with reliable, high bandwidth connections between them.

Figure 9:
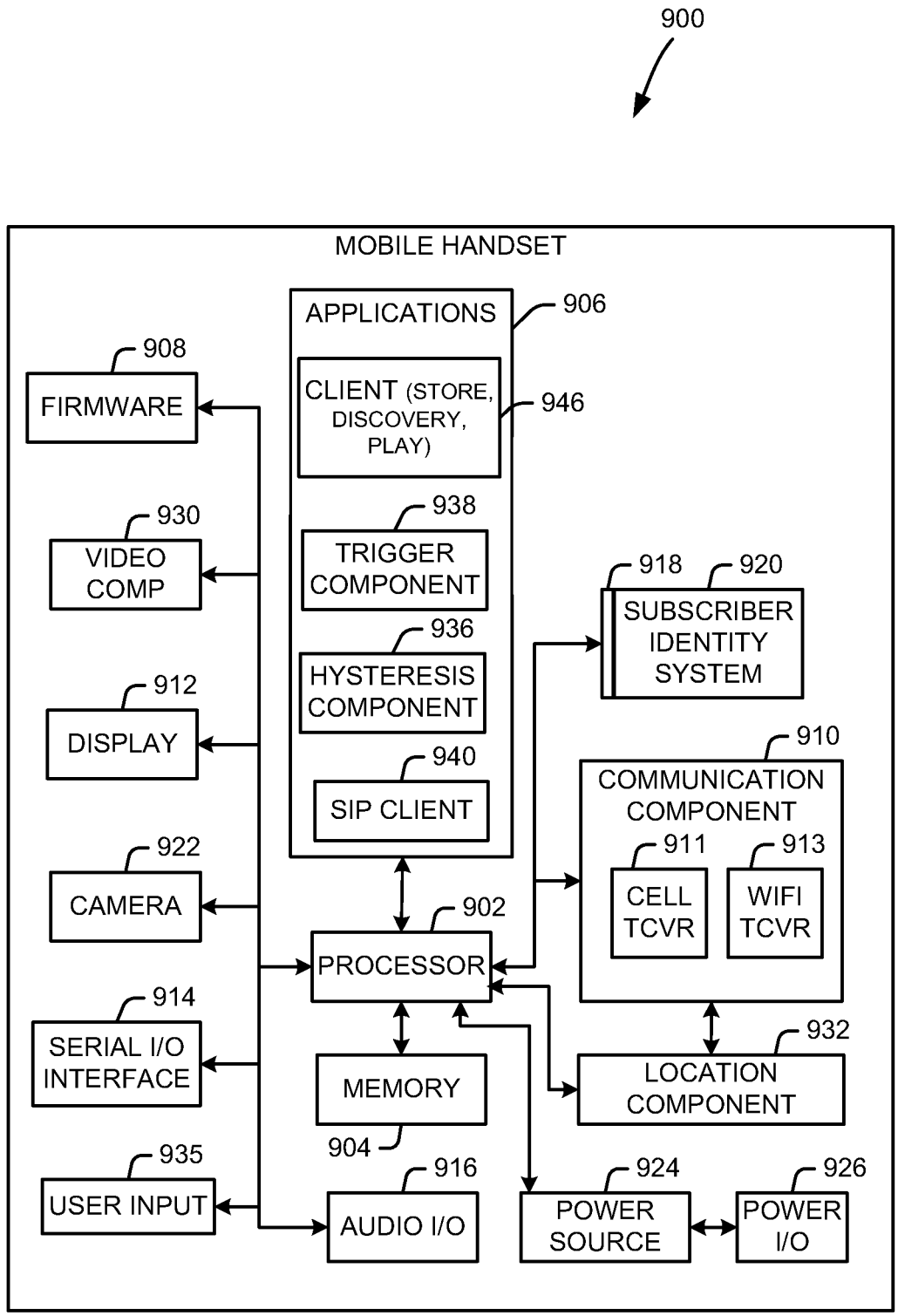
FIG. 9 illustrates an example block diagram of an example client device that can be a mobile client device, in accordance with various aspects and embodiments of the subject disclosure.

Referring now to FIG. 9, illustrated is a schematic block diagram of an example client device such as a cellphone or headset that can be a mobile device 900 capable of connecting to a network in accordance with some embodiments described herein. Although a mobile phone type device 900 is illustrated herein, it will be understood that other devices can be a mobile device, and that the mobile client device 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The client device 900 includes a processor 902 for controlling and processing operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the client device 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The client device 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The client device 900 includes a display 912 for displaying text, images, video, possibly telephony functions (e.g., a Caller ID function), setup functions, and for user input. For example, the display 912 can also be referred to as a "screen" that can accommodate the presentation of multimedia content (e.g., video images overlaid with augmented reality graphics, music metadata, messages, wallpaper, graphics, etc.). The display 912 can also display videos and can facilitate the generation, editing and sharing of video quotes. A serial I/O interface 914 can be provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the client device 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The client device 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that a SIM card 920, if present, can be manufactured into the client device 900, and updated by downloading data and software.

The client device 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the client device 900 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The client device 900 also includes a power source 924 in the form of batteries and/or an AC power subsystem, which power source 924 can interface to an external power system or charging equipment (not shown) by a power I/O component 926.

The client device 900 can also include a video component 930 for processing video content received and, for recording and transmitting video content. For example, the video component 930 can facilitate the generation, editing and sharing of video quotes. A location tracking component 932 facilitates geographically locating the client device 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the client device 900 to support SIP protocols and register the subscriber with the SIP registrar server. The applications 906 can also include a client 942 that provides at least the capability of discovery, play and store of multimedia content, for example, music.

The client device 900, as indicated above related to the communications component 910, includes an indoor network radio transceiver 913 (e.g., Wi-Fi transceiver). This function supports the indoor radio link, such as IEEE 902.11, for the dual-mode GSM client device 900. The client device 900 can accommodate at least satellite radio services through a client device that can combine wireless voice and digital radio chipsets into a single handheld device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 10:
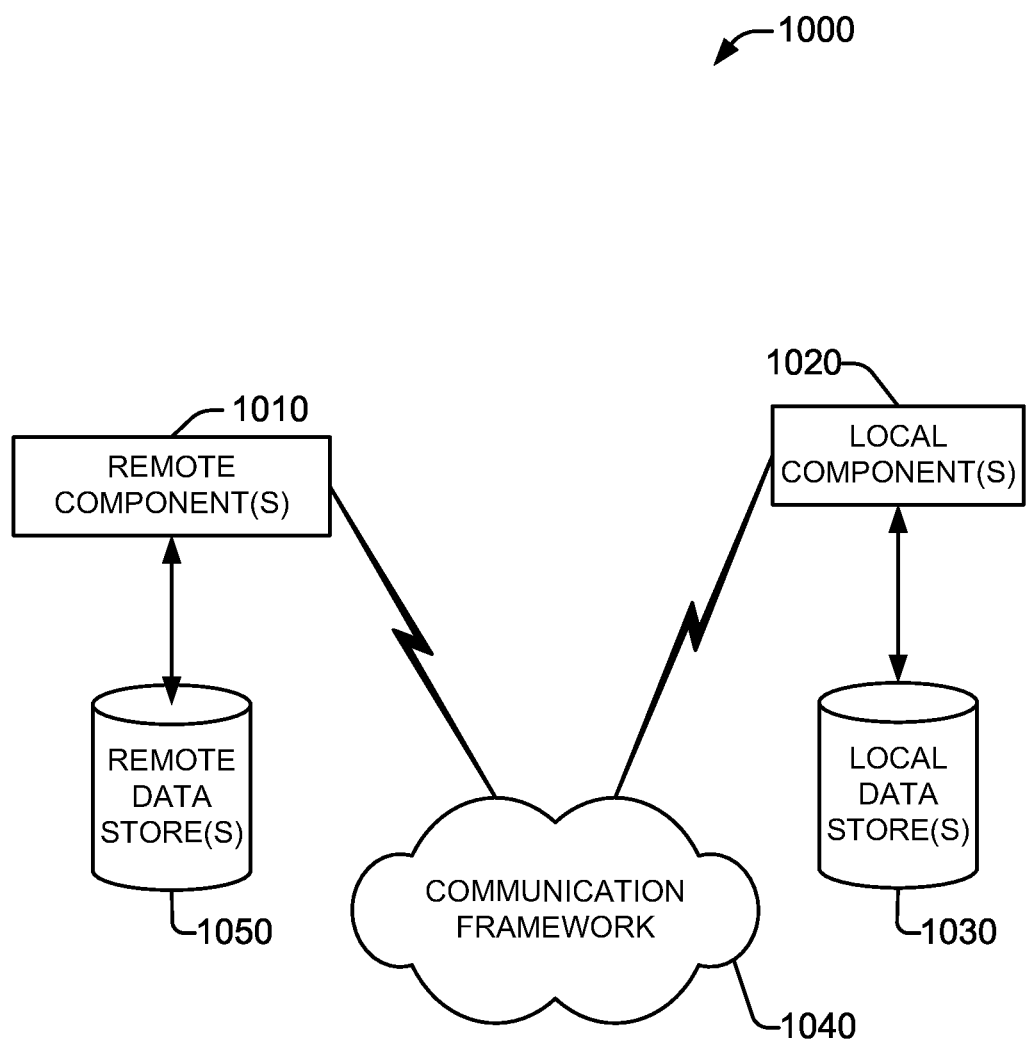
FIG. 10 is a block diagram representing an example computing environment into which aspects of the subject matter described herein may be incorporated.

FIG. 10 thus illustrates a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
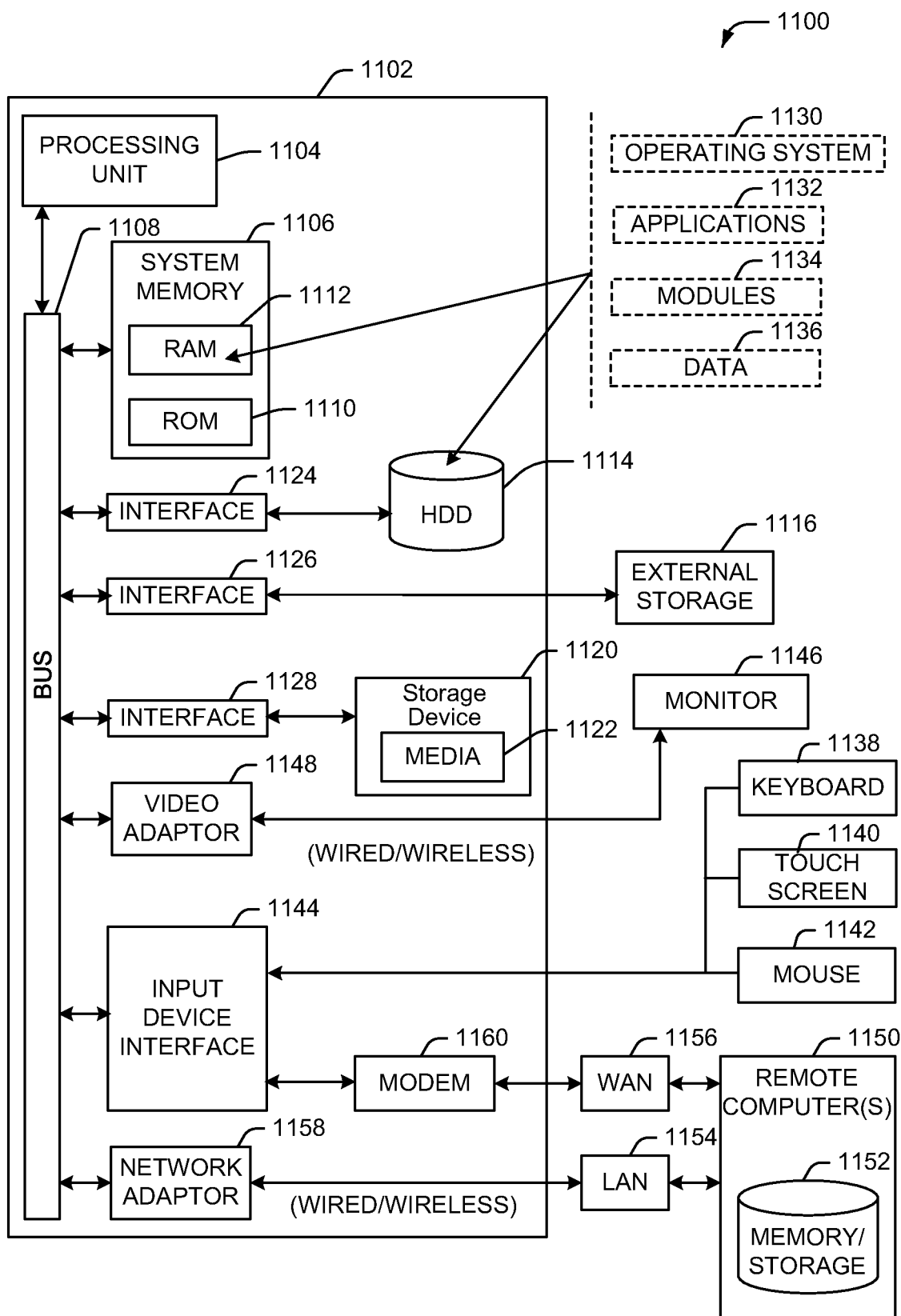
FIG. 11 depicts an example schematic block diagram of a computing environment with which at least some of the disclosed subject matter can interact and/or by which at least some of the disclosed subject matter can be implemented, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102.

Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, stand-alone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A client device, comprising:
   a processor; and
   a memory that stores executable instructions that, when executed by the processor, facilitate performance of operations, the operations comprising:
   maintaining a high framerate at a display of the client device comprising:
   initializing rendering of a plurality of augmented reality scenes at least partially in parallel with one another, wherein the plurality of augmented reality scenes is based at least on initial augmented reality information, and
   wherein the initializing is performed prior to a rendering of any of the plurality of augmented reality scenes on the display; and
   configuring the plurality of augmented reality scenes to be rendered in succession relative to one another.

2. The client device of claim 1, wherein the operations further comprise:
   obtaining live video data from a camera; and
   generating, based on the live video data, the initial augmented reality information.

3. The client device of claim 1, wherein the operations further comprise:
   rendering, on the display, the plurality of augmented reality scenes in succession to one another.

4. The client device of claim 3, wherein the operations further comprise:
   prior to the rendering on the display, obtaining, from a network device, augmented reality drawing data based on the initial augmented reality information,
   wherein the plurality of augmented scenes rendered on the display are based on the augmented reality drawing data.

5. The client device of claim 4, wherein the obtaining the augmented reality data comprises obtaining at least one of one or more render buffers or one or more draw commands.

6. The client device of claim 1, wherein the operations further comprise:
   detecting a changing of an orientation of a camera of the client device; and
   in response thereto, executing the initializing the rendering of at least one of the plurality of augmented reality scenes.

7. The client device of claim 1, wherein the initial augmented reality information comprises at least one of a set of one or more planes that represent respective one or more flat surfaces detected in a real-world environment, a three-dimensional mesh of a real-world environment, or lighting information.

8. A method, comprising:
   making available to a network device, by a client device, at least partially in parallel with one another, a plurality of sets of augmented reality information comprised by the client device,
   wherein the plurality of sets of augmented reality information correspond to a plurality of augmented reality scenes to be generated by the client device and to be subsequently displayed in succession on a display of the client device; and
   obtaining from the network device, by the client device, only after having made the plurality of sets of augmented reality information available to the network device, augmented reality drawing data generated by the network device and based on the plurality of sets of augmented reality information.

9. The method of claim 8, further comprising:
   rendering, by the client device, on the display of the client device, the plurality of augmented reality scenes in succession to one another.

10. The method of claim 9, wherein the plurality of augmented reality scenes rendered on the display are based on the plurality of sets of augmented reality information and on the augmented reality drawing data having been obtained from the network device.

11. The method of claim 8, wherein the obtaining the augmented reality drawing data comprises obtaining one or more render buffers or one or more draw commands.

12. The method of claim 8, wherein the obtaining the augmented reality drawing data comprises obtaining uncompressed data and compressed data.

13. The method of claim 8, further comprising:
   detecting, by the client device, a changing of a position of the client device; and
   in response to the detecting, generating, by the client device, at least one of the sets of the plurality of sets of augmented reality information.

14. The method of claim 8, further comprising:
   capturing, by a camera of the client device, live video; and
   generating, by the client device, the plurality of sets of augmented reality information based on the live video.

15. A non-transitory machine-readable medium, comprising executable instructions that, when executed by a processor of a client device, facilitate performance of operations, the operations comprising:

making available to a network device, at least partially in parallel with one another, a plurality of sets of augmented reality information comprised by the client device;

based on the plurality of sets of augmented reality information, initializing rendering of a plurality of augmented reality scenes at least partially in parallel with one another; and obtaining, from the network device, only after having made the plurality of sets of augmented reality information available to the network device and only after having initialized the rendering of the plurality of augmented reality scenes based on the plurality of sets of augmented reality information, augmented reality drawing data generated by the network device and based on the plurality of sets of augmented reality information.

16. The non-transitory machine-readable medium of claim 15, wherein the operations further comprise:

rendering, on a display of the client device, the plurality of augmented reality scenes in succession to one another.

17. The non-transitory machine-readable medium of claim 15, wherein the initializing is performed prior to a rendering of any of the plurality of augmented reality scenes on the display.

18. The non-transitory machine-readable medium of claim 15, wherein the operations further comprise:

in response to a detection of a change of a position of the client device, generating at least one of the sets of the plurality of sets of augmented reality information.

19. The non-transitory machine-readable medium of claim 15, wherein the obtaining the augmented reality drawing data comprises obtaining one or more draw commands comprised by uncompressed data and compressed data.

20. The non-transitory machine-readable medium of claim 15, wherein the operations further comprise:

acquiring video stream data from a camera of the client device; and overlaying, on a display of the client device, based on the augmented reality drawing data that was obtained, augmented reality graphics on video stream data to provide the plurality of augmented reality scenes.

* * * * *